United States Patent [19]
Rolfe

[11] Patent Number: 4,509,894
[45] Date of Patent: * Apr. 9, 1985

[54] LOADING AND UNLOADING APPARATUS FOR A VEHICLE

[76] Inventor: Keith O. Rolfe, 564 Zillmere Rd., Zillmere, Queensland, Australia, 4034

[ * ] Notice: The portion of the term of this patent subsequent to Oct. 26, 1999 has been disclaimed.

[21] Appl. No.: 377,869

[22] Filed: May 13, 1982

Related U.S. Application Data

[63] Continuation-in-part of Ser. No. 169,028, Jul. 15, 1980, Pat. No. 4,355,942.

[51] Int. Cl.³ .............................................. B60P 1/00
[52] U.S. Cl. .................................... 414/555; 414/917
[58] Field of Search ................ 414/498, 546, 555, 917

[56] References Cited

U.S. PATENT DOCUMENTS

| | | | |
|---|---|---|---|
| 2,639,825 | 5/1953 | Eakin | 414/546 |
| 3,233,758 | 2/1966 | Darfus | 414/546 X |
| 3,622,026 | 11/1971 | Tornheim | 414/498 X |
| 3,630,395 | 12/1971 | Burge | 414/546 |
| 3,701,443 | 10/1972 | van der Lely | 414/546 |
| 4,278,390 | 7/1981 | Ahearn | 414/555 X |
| 4,355,942 | 10/1982 | Rolfe | 414/555 |
| 4,453,878 | 6/1984 | Paukku | 414/498 X |

FOREIGN PATENT DOCUMENTS 2017045 9/1979 United Kingdom ................ 414/917

Primary Examiner—Robert J. Spar
Assistant Examiner—Ken Muncy
Attorney, Agent, or Firm—Schwartz, Jeffery, Schwaab, Mack, Blumenthal & Koch

[57] ABSTRACT

Loading and unloading apparatus for a vehicle including a lifting frame having latches or hooks for attachment to a cargo body or platform, parallel motion links connecting the lifting frame to the vehicle, and hydraulic rams operable to move the links to move the load between a carrying position on the vehicle and a loading or unloading position at ground level behind the vehicle.

6 Claims, 11 Drawing Figures

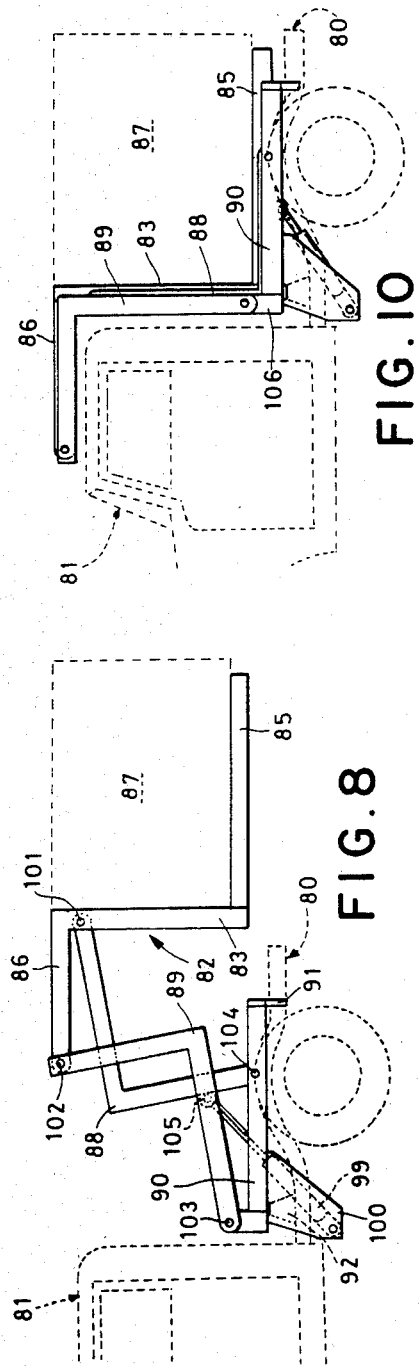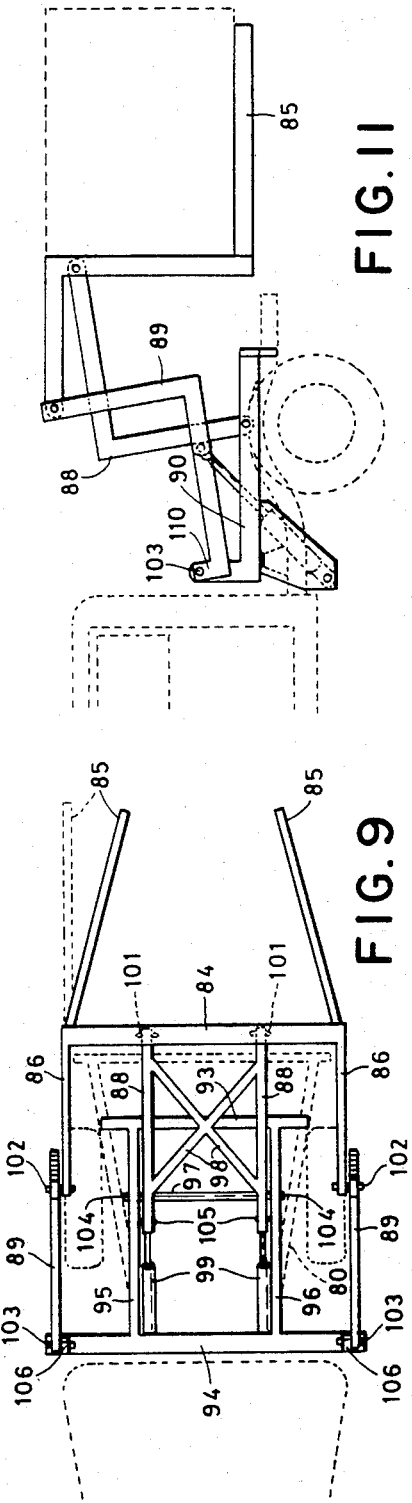

LOADING AND UNLOADING APPARATUS FOR A VEHICLE

CROSS REFERENCE TO RELATED APPLICATIONS

This is a continuation-in-part of U.S. application Ser. No. 169,028, filed July 15, 1980, now U.S. Pat. No. 4,355,942.

BACKGROUND OF THE INVENTION

1. Field of the Invention

This invention relates to a loading and unloading apparatus for vehicles.

2. Prior Art

There are many applications where cargo loads must be loaded onto, or off of, vehicles, e.g., in factories or warehouses or at distribution or retail outlets. In most of these applications, it has not been economically justifiable to fit the vehicle with its own loading and unloading means. This has meant that the vehicle must be loaded or unloaded manually or using additional equipment, e.g, a mobile crane.

Some vehicles have been provided with lifting tail-gates which can raise cargo from the ground to the vehicle tray and vice versa but these tail-gates have limited load capacities and require that the cargo load can be pushed onto or off them.

SUMMARY OF THE INVENTION

It is an object of the present invention to provide, for a vehicle, apparatus which may be used to lift a cargo body or load from a position at or near to ground level onto the vehicle, and also to unload the cargo body or load from the vehicle to the ground, the loading and unloading operations being carried out quickly and easily.

It is a preferred object to provide an apparatus where the load is readily detachable and where the apparatus may be used with a wide range of cargo bodies or loads.

It is a further preferred object to provide an apparatus where the cargo body or load is maintained substantially horizontal during its transfer from the loading or unloading position to the carrying or loaded position, or vice versa.

It is a still further preferred object to provide an apparatus which may be fitted directly to the vehicle or which is mounted on a sub-frame which can be transferred from vehicle to vehicle in a fleet.

Other preferred objects of the present invention will become apparent with reference to the following description.

In one aspect the present invention resides in a loading and unloading apparatus for a vehicle including:

a lift assembly for attachment to a cargo body or load;

links pivotally connected to the lift assembly and the vehicle; and means for moving the links to move the cargo body or load, in substantial parallelism, to either a carrying or loaded position on the vehicle, or to a loading or unloading position, at or near ground level behind the vehicle.

The lift assembly may comprise a rectangular top frame which is integral with, or releasably connected to, a cargo body or to a shipping container. One suitable form of releasable connection is the well known twist-lock which engages in sockets in the corners of the container.

Alternatively, the lift assembly may include at least one releasable hitch mounted on one or more lift arms extending rearwardly from a lifting frame. The lift arms may be fixed or adjustable in length depending on the application. A back frame may be provided to engage the cargo body or load to provide strength and stability to the lift assembly.

The links may comprise two pairs of parallel links, each pair being pivotally mounted on one side of the vehicle (or on a sub-frame fitted to the vehicle) and to the lift assembly.

Alternatively, a pair of L-shaped links may be pivotally connected at one end to the lift assembly and at the other end to the vehicle (or sub-frame). A second pair of links is also pivotally connected to the lift assembly and the vehicle (or sub-frame), at pivot points rearwardly (and preferably above) the pivot points of the L-shaped links forming a parallel-linkage assembly.

Hydraulic rams may be mounted on the lift assembly, the vehicle and/or sub-frame and connected to the links to move the lift assembly between the carrying or loaded position and the loading or unloading position.

To provide stability for the vehicle, retractable legs may be fitted at the rear of the vehicle, the legs being extended to their ground engaging position rearwardly of the vehicle before the cargo body or load is moved.

BRIEF DESCRIPTION OF THE DRAWINGS

To enable the invention to be fully understood, a number of preferred embodiments will now be described with reference to the accompanying drawings, in which:

FIG. 8 is a side view of an apparatus according to a third embodiment of the invention, the load being moved toward the unloaded position;

FIG. 9 is a top plan view of the apparatus of the third embodiment in the position shown in FIG. 8;

FIG. 10 shows the apparatus of the third embodiment in the loaded position; and

FIG. 11 shows a modified version of the third embodiment of the present invention.

DETAILED DESCRIPTION OF THE PREFERRED EMBODIMENT OF INVENTION

Figure 1:
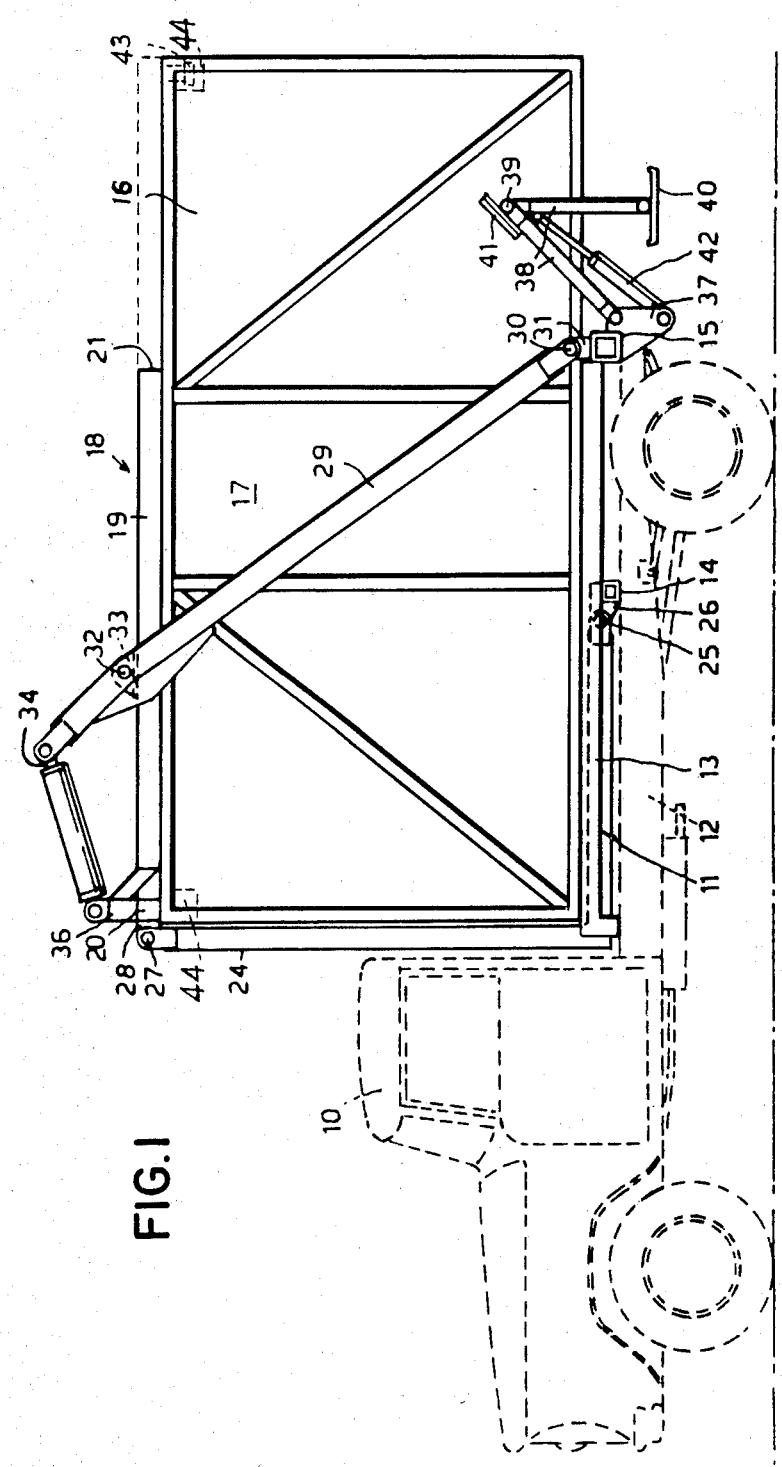
FIG. 1 is a side elevational view of the apparatus according to one embodiment of the invention applied to a vehicle, the cargo body being shown in the loaded position.
Figure 2:
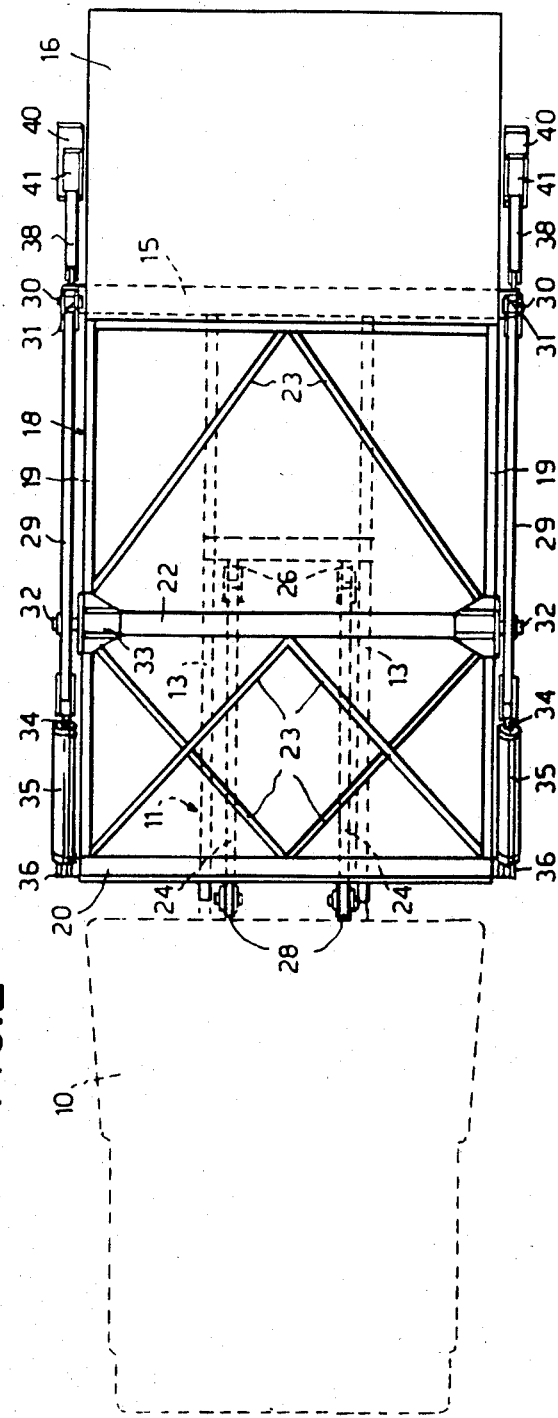
FIG. 2 is a plan view of the apparatus shown in FIG. 1.
Figure 3:
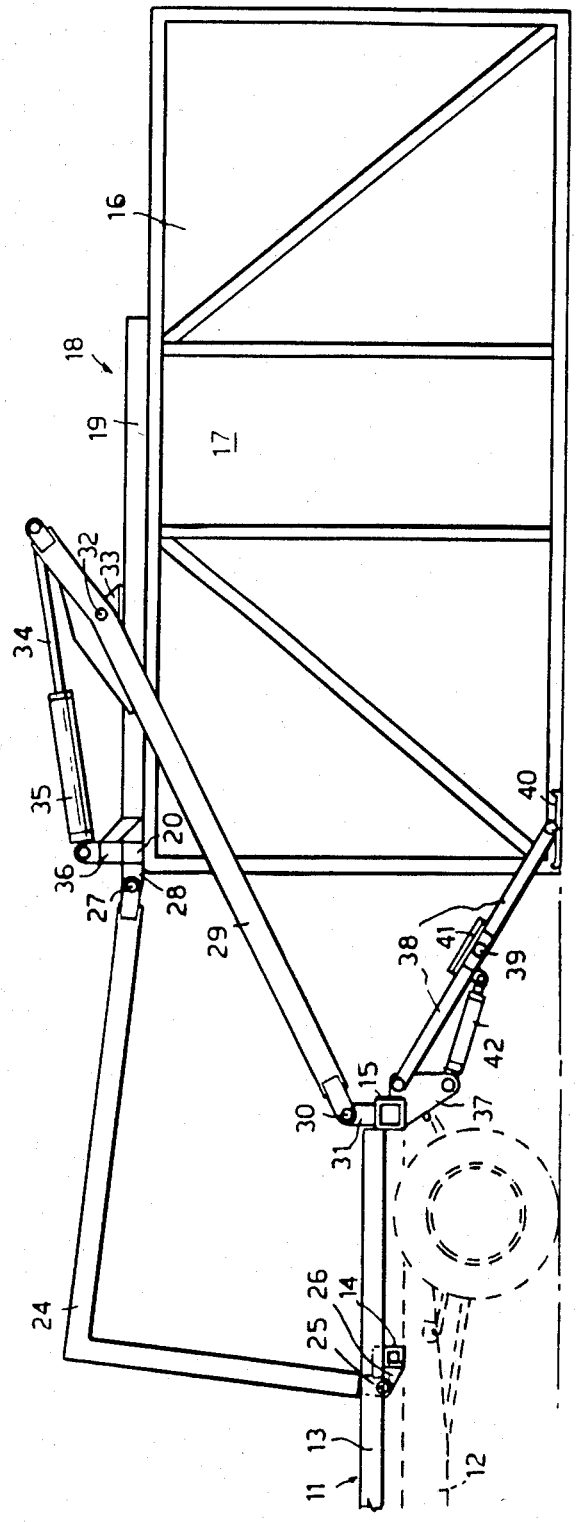
FIG. 3 is a side view of the apparatus with the cargo body in unloaded position.

The loading apparatus shown in FIGS. 1 to 3 of the drawings is applied to a conventional motor vehicle indicated in broken outline at 10, and it includes a sub-frame 11 which is welded or otherwise fixed to the chassis 12 of the vehicle. The sub-frame has two parallel side members 13 interconnected by an intermediate cross-member 14 and by a rear member 15 which extends outwardly to both sides of the member 13.

The apparatus is made and arranged to load a cargo body 16 onto the vehicle, and to unload it onto the ground behind the vehicle. The cargo body is a large rectangular container having a door or doors (not shown) at the back, and also a side door 17. On top of the cargo body there is fixed a rectangular top frame 18 having a pair of side members 19 rigidly interconnected by front and back end pieces 20 and 21 and an intermediate cross-member 22 and braced by oblique stays 23.

A pair of L-shaped inner lift links 24 have corresponding ends pivoted at 25, about a common transverse axis, to brackets 26 on the sub-frame cross-member 14, their other ends being pivoted about a common transverse axis at 27 to a pair of lugs 28 extending forwardly from the front end piece 20 of the top frame 18.

The cargo body, when in loaded position as shown in FIGS. 1 and 2, rests upon the sub-frame 11, the inner lift links then extending forwardly under the cargo body and between the sub-frame side members 13 to positions immediately in front of the cargo body, and then extend vertically up in front of the cargo body and close behind the driver's cabin of the vehicle 10.

The loading apparatus further includes a pair of outer lift links 29, each pivoted at its lower end, at 30, to an apertured lug 31 at a side of the sub-frame rear member 15, and pivoted at a position near to its upper end, at 32, to a pivot bracket 33 on a side member 19 of the top frame 18. The upper end of each outer lift link 29 is pivotally connected to the piston 34 of a double-acting hydraulic cylinder 35 which is pivoted to a bracket 36 at one side of the front of the top frame 18. The two hydraulic cylinders 35 of the apparatus are connected, for operation in unison, to the hydraulic system of the vehicle 10.

Pivoted to a pair of rear brackets 37 at the sides of the back of the sub-frame 11 are two support legs 38, each hinged near to its middle at 39 and, at its end remote from its connection to the sub-frame, pivoted to a foot 40. A stop 41 allows pivotal movement of the two parts of the stop leg in one direction, preventing it in the other direction. A hydraulic cylinder 42 pivoted to each rear bracket 37, its piston pivoted to the connected support leg, can be operated to lift the leg to raised or traveling position, as shown in FIGS. 1 and 2, or to bring the leg down to operative position as shown in FIG. 3, the foot 40 on the ground behind the vehicle, the leg straight.

If the cargo body 16 is initially in loaded position, as shown in FIGS. 1 and 2, it may be brought down to loading or unloading position, as shown in FIG. 3, by extending the support legs 38 by the simultaneous operation of the coupled hydraulic cylinders 42, and then by extending the pistons of the hydraulic cylinders 35, so that the cargo body 16 is swung up, back and down, remaining in parallelism, until it is brought down onto the ground behind the vehicle 10. The doors of the cargo body can then be opened to enable articles to be quickly and easily removed from, or loaded into the cargo body, which may be replaced on the vehicle by retraction of the pistons of the cylinders 35, the support legs 38 then being brought to their traveling positions. The cylinders 35 and 42 may be connected in the vehicle's hydraulic circuit so that the support legs 38 are automatically brought down to operative position before the cargo body is moved from its loaded position, and are automatically raised to traveling position when the cargo body has been brought back to its loaded position.

The cargo body may be a generally conventional shipping container, and the top frame 18 may be made for releasable attachment thereto being, for example, extended rearwardly (as shown in dashed lines in FIG. 1), so as to be located over all four top corners of the container and provided at these positions with quick-release locking means, e.g. twist-locks 43, for engagement with the sockets 44 customarily provided on such containers.

In a modified form of the invention, the hydraulic cylinder 35, instead of being connected between the extended top parts of the outer lift arms 29 and the front of the top frame 18, may instead be connected between the tops of these lift arms and the back of the top frame, or may be connected between the lower parts of the lift arms and the sub-frame 13.

In a second modified form of this invention, the pivots 25 may lie outside the chassis 12 of the vehicle and the inner lift links 24 may be replaced linear links parallel to the outer lift links 29 and interconnecting the pivots 25 and 27.

Referring to the second embodiment shown in FIGS. 4 to 7, the apparatus illustrated is applied to the chassis side members 50 of a motor vehicle 51. The lift assembly includes a substantially vertical back frame 52 having a pair of parallel side members 53 rigidly interconnected by a sturdy transverse top member 54 and a pair of cross-bars 55. A pair of parallel top arms 56 are rigidly secured to and extend forwardly from the sides of the top member 54. Any suitable attachment means are provided for releasably securing a load, as indicated at 57, to the lift assembly, the particular attachment means illustrated herein consisting of a longitudinally adjustable lift arm 58 secured rigidly to and extending rearwardly from the middle of the top member 54 and terminating in a hitch at 59 adapted to be releasably engaged with the top of the load when the load is adjacent to the back frame 52.

Connected to the lift assembly are a pair of similar lifting links 60 and a pair of stabilizing links 61.

Each of the lifting links 60 is L-shaped, with one end pivoted at 62 in front of the transverse top member 54 of the assembly back frame 52, and with the other end pivoted at 63 to a chassis side member 50.

A pair of double-acting hydraulic cylinders 64, pivoted to the vehicle chassis and connected in the vehicle's hydraulic system, have their pistons 65 pivoted in corresponding positions to the two lifting links 60.

Each of the stabilizing links 61 is of cranked form, having a straight main central section with a top arm 66 extending perpendicularly from its top in one direction, and a bottom lug 67 extending perpendicularly from its bottom in the opposite direction. The two stabilizing links 61 have their upper extremities pivoted at 68 outside the front ends of the lift assembly top arms 56, and their lower extremities pivoted at 69 to mounting brackets 70 on the chassis side members 50.

Figure 4:
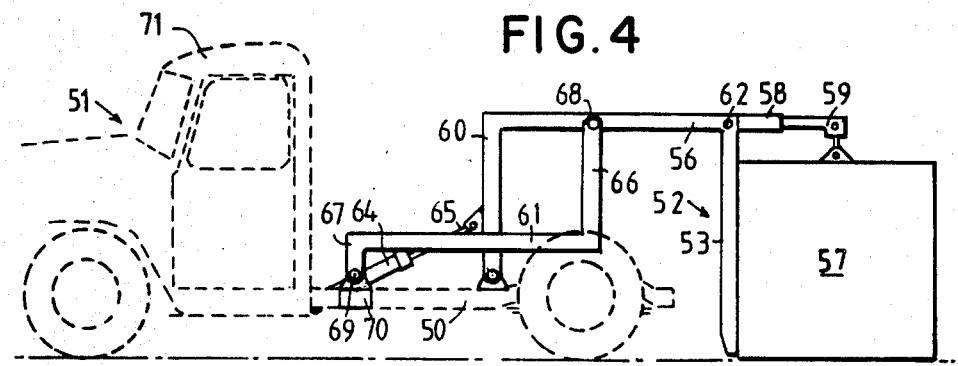
FIG. 4 is a side view of the apparatus according to a second embodiment of the invention, the load being in the unloaded position.

With the lift assembly of the apparatus in the loading and unloading position shown in FIG. 4, the vehicle 51 can be backed to a load 57 until the back frame 52 is brought against the load, which may then be engaged and held by the attachment means hitch 59.

Figure 5:
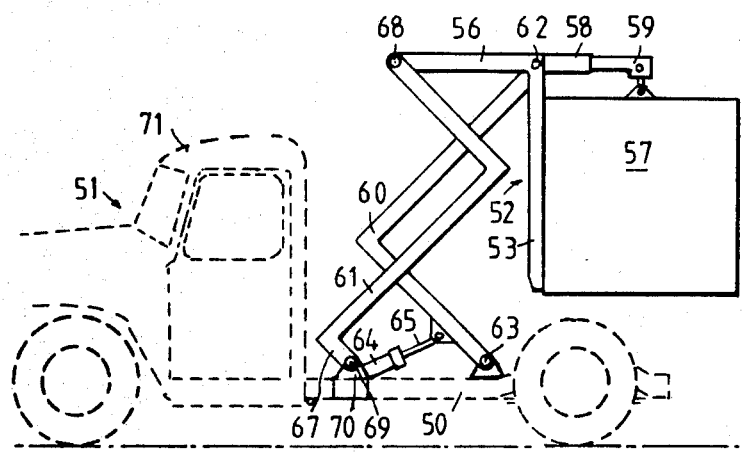
FIG. 5 shows the apparatus of the second embodiment moved towards the loaded position.
Figure 6:
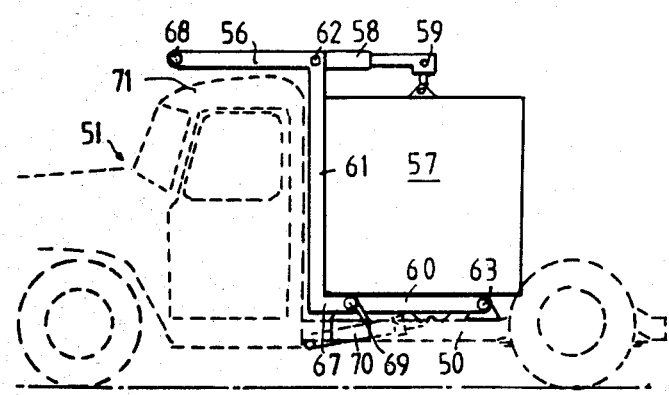
FIG. 6 shows the apparatus of the second embodiment in the loaded position.
Figure 7:
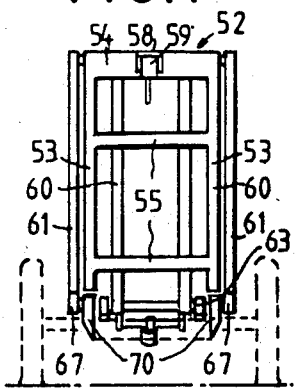
FIG. 7 is a rear elevational view of the apparatus of the second embodiment in the position shown in FIG. 6.

The hydraulic cylinders 64 are then operated to cause the two lifting links 60 to be swung forwardly and down, the stabilizing links 61 ensuring that the lifting assembly, together with the engaged load 57, are moved in parallelism, the load being lifted above the ground and forwardly, as shown in FIG. 5. With continued operation of the hydraulic cylinders, the parts are brought to the positions shown in FIGS. 6 and 7, the main central sections of the stabilizing links 61 being disposed substantially vertically close behind the cabin 71 of the vehicle, their top arms 66 extending horizontally close over the cabin. The top arms 56 of the lift assembly are then disposed between and parallel to the top arms 66 of the stabilizing links, the lift assembly back frame 52 being aligned between the main central sections of the stabilizing links. The two L-shaped lifting links 60 then have corresponding parallel parts disposed horizontally, supporting the load 57, their other corresponding parallel parts being vertical and aligned between the side members 53 of the lift assembly back frame. The apparatus, then, when the load is lifted onto the vehicle, is in very compact form, close behind and over the vehicle cabin.

If desired, a pair of lifting fork arms may extend rearwardly from the bottom of the lift assembly back frame 52, or a horizontal platform may be used instead, and in either case the lift arm 58 and hitch 59 may be omitted. As a further modification, the back frame 52 may be omitted, and a hoist may extend from the top of the lift assembly, operated by any suitable type of winch.

A third embodiment of the apparatus is shown in FIGS. 8–10. The third embodiment is attached to motor vehicle 81 (shown in phantom lines) through sub-frame 90 and chassis 80. Sub-frame 90 comprises a forward cross-member 94 and a rear cross-member 93 which are inteconnected by sub-frame side members 95 and 96. Sub-frame 90 may be attached to chassis 80 by brackets 91 and 92 which are welded to the sub-frame and chassis.

The lift assembly of the apparatus comprises a substantially vertical back frame 82 which has a pair of parallel side members, one of which is shown at 83, and a top member 84 which is attached across the side members. The side members 83 are releasably connected at their bottoms to a tray support having arms 85. A pair of parallel top arms 86 are rigidly secured to an extend forwardly from the sides of the top member 84. A load, such as indicated at 87, may be positioned on tray support arms 85 and connected to side frame member 83 in any convenient manner.

Connected to the lift assembly are a pair of similar lifting links 88 and a pair of stabilizing links 89. Each of these lifting links 88 is L-shaped with one end pivoted at 101 to the upper portion of a side frame member 83 just below top member 84. The other end of each lifting link 88 is pivotally connected at 104 to one of the side members 95 or 96 of sub-frame 90. A pivot shaft 97 forms both pivot joints 104 by extending through both of the lifting links and also through sub-frame side members 95 and 96, as shown in FIG. 9.

A pair of double-acting hydraulic cylinders 99 are pivotally mounted to mounting plates 100 which are attached to sub-frame 90. These double-acting cylinders are connected to the vehicle's hydraulic system and have their pistons pivotally mounted to the two lifting links 88 a short distance from pivot joints 104, as shown at 105.

Each of the stabilizing links 89 is L-shaped with an upper arm pivotally mounted to the rear of one top arm 86 at 102, and a bottom arm extending substantially perpendicularly from the top arm and pivotally connected to the sub-frame at pivot joint 103. Pivot joints 103 are positioned on raised bosses 106 which are mounted on forward cross-member 94 of the sub-frame.

The entire apparatus may be stiffened as necessary. For example, cross-frame members 98 may be connected between lifting links 88 to provide proper rigidity, as shown in FIG. 9. Also, stiffening plates, gussets or the like may be attached to the apparatus where needed.

With the pistons of cylinders 99 fully retracted, as shown in FIG. 10, stabilizing links 89 are positioned with their upper arms over the cab of motor vehicle 81 and their bottom arms vertical. Lifting links 88 are positioned such that one portion of each lifting link is vertical and the other portion is horizontal. This leaves virtually the entire bed of the motor vehicle free to receive load 87. When it is desired to move the load from the motor vehicle bed, cylinders 99 are operated causing lifting links 89 to be swung rearwardly and down with stabilizing links 88 ensuring that the lifting assembly, together with the load 87, are moved in parallelism. The load is thus moved rearwardly and downward as shown in FIG. 8. Hydraulic cylinders 99 are continued to be operated until load 87 reaches the desired level, whether it is ground level, a level of an adjacent loading dock or the like. Once at the desired level, load 87 may be removed or filled with cargo or the like.

Tray support arms 85 may be used in the manner of lifting fork arms to handle loads such as shown at 87. Alternatively, back frame 82 may be omitted and a hoist may extend from the top of the lift assembly to be operated by any suitable type of winch.

It should be understood that lifting links 88 and stabilizing links 89 are shaped so as not to interfere with the cargo carrying capacity of the motor vehicle. In certain applications, it may be necessary to alter the positioning of the pivot points of these elements at the connection to the vehicle frame. For example, as shown in FIG. 11, in order to accommodate the motor vehicle frame and/or body protrusions, the bottom arms of stabilizing links 89 are provided with extensions 110 which are parallel to the upper arms and contain the pivot joints 103. Similar modifications may be made at other pivot joints.

It will be readily apparent to the skilled addressee that many other variations and modifications may be made to the embodiments described without departing from the scope of the present invention.

What is claimed is:

1. Loading and unloading apparatus for a vehicle, comprising:
    (a) a lift assembly including a frame releasably connected to a load, said frame including a substantially vertical back frame having a pair of parallel side members interconnected by a transverse top member, said back frame being adapted to engage a forward end of said load, and a pair of parallel arms rigidly attached to said top member and extending forwardly thereof relative to said vehicle;
    (b) parallel motion links connecting said frame to said vehicle, said links comprising a pair of L-shaped lifting links each having one end pivotally connected to said frame and the other end pivotally connected to the vehicle, and a pair of stabilizing links each having an upper arm with two ends, one end of said upper arm being pivotally connected to one of the parallel arms of the frame, and a bottom arm extending substantially perpendicularly from said upper amr, said bottom arm having two ends, one of said bottom arm ends being fixedly connected to the other of said upper arm ends, and the other of said bottom arm ends being pivotally connected to said vehicle; and (c) means for moving said lifting and stabilizing links in parallelism to move the back frame to either a carrying or loaded position supported on the vehicle, or to a loading or unloading position at or near ground level behind the vehicle.

2. An apparatus as claimed in claim 1, wherein said moving means comprises a hydraulic ram interconnecting said lifting links and the vehicle so that retraction and extension of the ram causes said lifting and stabilizing links to move the back frame from the carrying or loaded position to the loading or unloading position, respectively.

3. An apparatus as claimed in claim 1, wherein said bottom arm includes an extension which is substantially parallel to said upper arm, said bottom arm being pivotally connected to said vehicle at said extension.

4. An apparatus as claimed in claim 1, wherein said vehicle includes a cab and a bed, and wherein when said back frame is in the loaded position, said upper arms of said stabilizing links extend over the top of said cab and said bottom arms extend substantially vertically behind said cab.

5. An apparatus as claimed in claim 1, wherein said vertical back frame has a pair of parallel side members releasably connected at their bottom ends to a load support tray having rearwardly directed arms.

6. An apparatus as claimed in claim 1, wherein when the back frame is in said loaded position, a portion of each L-shaped link extends substantially vertically behind said cab.

* * * * *